United States Patent
Reddy et al.

[11] Patent Number: 5,896,951
[45] Date of Patent: Apr. 27, 1999

[54] OPTIMIZATION OF MAGNETIZING CURRENT IN LINEAR INDUCTION MOTORS

[75] Inventors: K. Narasimha Reddy, Bolton; Brian J. Amend, West Hartford; Donald F. Cominelli, Bristol; Richard N. Fargo, Plainville; James P. Towey, Jr., Bristol; William F. Brooks, Farmington, all of Conn.

[73] Assignee: Otis Elevator Company, Farmington, Conn.

[21] Appl. No.: 08/746,256

[22] Filed: Nov. 7, 1996

[51] Int. Cl.⁶ .............................. B66B 13/14; G05B 11/12
[52] U.S. Cl. ........................ 187/316; 187/317; 318/807; 318/687
[58] Field of Search ..................... 187/316, 317; 318/135, 369, 366, 430, 431, 807, 687

[56] References Cited

U.S. PATENT DOCUMENTS

| 4,532,464 | 7/1985 | Igarashi et al. | 318/807 |
|---|---|---|---|
| 5,021,724 | 6/1991 | Hirano | 318/807 |
| 5,509,504 | 4/1996 | McHugh et al. | 187/316 |
| 5,668,355 | 9/1997 | Jaminet et al. | 187/316 |
| 5,678,647 | 10/1997 | Wolfe et al. | 180/65.3 |
| 5,682,023 | 10/1997 | McHugh et al. | 187/316 |
| 5,691,591 | 11/1997 | McCann | 310/198 |

FOREIGN PATENT DOCUMENTS

| 0614844A2 | 9/1994 | European Pat. Off. | B66B 13/14 |
|---|---|---|---|
| 0673110A1 | 9/1995 | European Pat. Off. | H02P 21/00 |
| 0676527A1 | 10/1995 | European Pat. Off. | E05F 15/18 |

OTHER PUBLICATIONS

EPC Search Report for Serial No. 97308739.8–2207 dated Feb. 19, 1998.
Linear induction Motors as 'electromagnetc rivers', J.F. Eastham and E.R. Laithwaite, undated.

*Primary Examiner*—Robert Nappi

[57] ABSTRACT

Magnetizing current generated in a linear induction motor driving elevator car doors in elevator systems is optimized. Magnetizing current level is set low for door operation modes requiring lower levels of thrust, such as hold open and hold closed. Magnetizing current level is increased for modes of door operation requiring greater thrust levels, such as closing or opening. Optimization of magnetizing current in linear induction motors reduces overheating and increases energy efficiency.

4 Claims, 3 Drawing Sheets

OPTIMIZATION OF MAGNETIZING CURRENT IN LINEAR INDUCTION MOTORS

CROSS-REFERENCE TO RELATED APPLICATIONS

This application is related to commonly owned co-pending applications filed on the same day herewith having Ser. No. 08/746,281.

TECHNICAL FIELD

The present invention relates to elevator systems and, more particularly, to linear induction motors operating elevator car doors therefor.

BACKGROUND OF THE INVENTION

In conventional elevator systems, elevator car doors are selectively opened and closed by a rotary electric motor driving mechanical assemblies, which typically include a plurality of moving parts such as gear boxes, a set of drive arms, and linkages. The major drawback to the existing elevator car door systems is their susceptibility to misalignments, which necessitate adjustments and result in high maintenance costs. Also, the misalignments degrade the performance of the system such that the doors' opening and closing functions are not consistently smooth.

Linear motors ca n potentially provide an alternative to the conventional door operating systems by eliminating the mechanical linkages and problems associated therewith. Linear motors typically include a motor primary unit and a motor secondary unit. The motor secondary and the motor primary move past each other to open and close elevator car doors. Typically, linear motors have a much larger magnetic air gap between the parts of the motor than do conventional rotary motors. To compensate for the larger air gap, linear motors must operate at a much higher current level than conventional motors. The greater current level generates heat and may result in overheating. The problem of overheating in linear motors of elevator car door systems is exacerbated because the linear motor is situated in a limited space environment and the heat cannot dissipate easily. Overheating is highly undesirable because it results in efficiency losses and can cause a short circuit. Therefore, a temperature rise in near motors must be controlled.

DISCLOSURE OF THE INVENTION

It is an object of the present invention to improve the performance of a linear induction motor that operates elevator car doors.

It is another object of the present invention to reduce heat rise in linear induction motors that operate elevator car doors.

It is a further object of the present invention to reduce energy losses in linear induction motors.

According to the present invention, magnetizing current is optimized in a linear induction motor for each mode of operation of elevator car doors in an elevator system. Some modes of operation, such as hold close and hold open, require less thrust than the opening or closing mode of operation. Lower levels of thrust can be achieved with a lower magnetizing current. Reduction of magnetizing current during modes of operation that require significantly lower levels of thrust reduces prohibitive temperature rise in the motor primary. Additionally, optimization of the magnetizing current reduces energy losses in the motor primary.

One advantage of the present invention is that power consumption is reduced.

Another advantage of the present invention is that the life of transistors used is increased.

The foregoing and other advantages of the present invention become more apparent in light of the following detailed description of the exemplary embodiments thereof, as illustrated in the accompanying drawings.

BEST MODE FOR CARRYING OUT THE INVENTION

Figure 1:
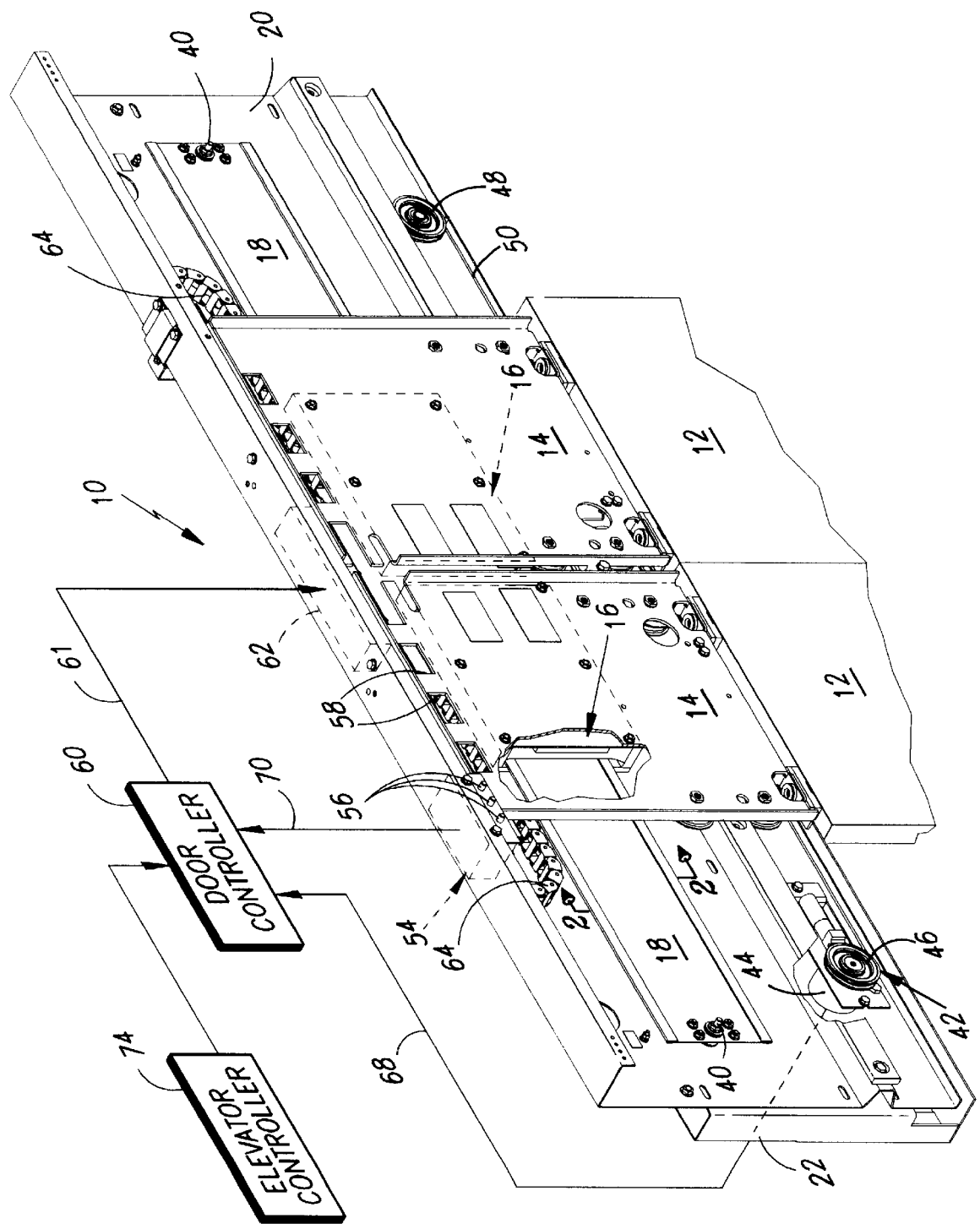
FIG. 1 is a schematic, perspective representation of a system operating elevator car doors in an elevator.

Referring to FIG. 1, an elevator car door operating system 10 for opening and closing a pair of elevator car doors 12 that are suspended from a pair of door hangers 14 includes a pair of moving motor primaries 16 fixedly attached to the pair of door hangers 14 and a motor secondary 18 attached to a header bracket 20 secured to a cab facia 22 of the elevator car (not shown).

Figure 2:
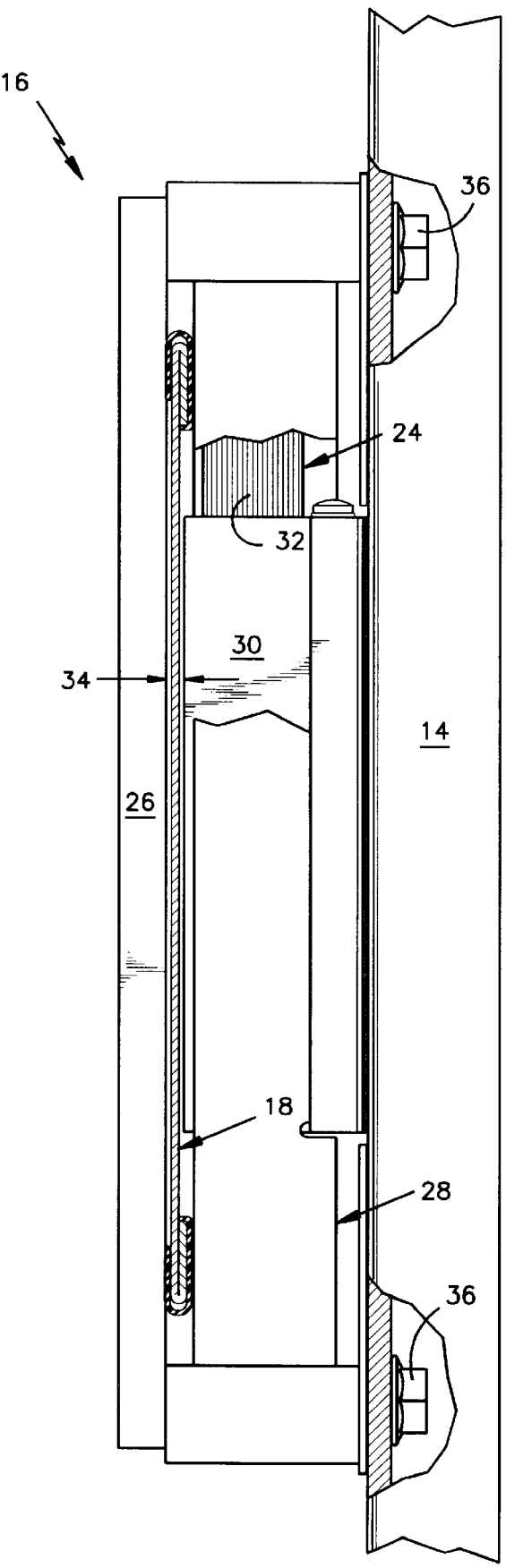
FIG. 2 is a cross-sectional, schematic side view of the system operating elevator car doors of FIG. 1 taken along line 2—2.

Referring to FIG. 2, each of the moving motor primaries 16 includes a primary winding 24 and a backiron 26 spaced apart from the primary winding 24 by a plurality of motor spacers 28. The primary winding 24 includes a primary iron unit 30 with winding 32 wrapped about it. A magnetic air gap 34 is defined between the primary winding 24 and the backiron 26. Each moving motor primary 16 is fixedly attached to the door hangers 14 by means of a plurality of bolts 36 passing through the backiron 26 and the motor spacers 28.

The motor secondary 18 extends the length of the elevator car and fits between the backiron 30 and the primary winding 28 as the motor primaries 16 travel across, opening and closing the elevator car doors 12. The motor secondary 18 is fabricated from an electrically conductive metal.

The motor secondary 18 is movably attached onto the header bracket 20 at two ends thereof, as best seen in FIG. 1. The motor secondary 18 is mounted to the header bracket 20 on a standoff 40 to allow the backiron 26 to travel between the header bracket 20 and the motor secondary 18.

A first positioning system 42 is fixedly attached onto the header bracket 20 and includes an encoder 44 directly coupled to an encoder pulley 46. An idler pulley 48 is disposed on the opposite end of the header bracket 20. A relating cable 50, extending over the encoder pulley and the idler pulley, is attached onto each elevator car door 12.

A second positioning system 54 includes a plurality of sensors 56 disposed on the header bracket 20 in register with a plurality of openings 58 formed within the door hanger 14.

A door controller box 60 is disposed on top of the elevator car (not shown) and via electrical cable 61 is in communication with a termination box 62 attached to the top portion of the header bracket 20. A pair of flexible cables 64 originates at the termination box 62 and connects the termination box 62 with each motor primary 16. A signal is sent from the first positioning system 42 to the door controller 60 through a first cable 68. A second cable 70 carries a signal from the second positioning system 54 to the door controller 60. The first and second position systems 42, 54 determine the speed and direction of the elevator car doors 12.

The door controller 60 includes a processor unit such as a microprocessor. The processor unit includes a CPU, ROM, RAM, busses, and input/output ports all suitably interconnected as would be well understood by those skilled in the art. According to the preferred embodiment of the invention, the routine of FIG. 3 is suitably coded and stored, for example, in ROM, RAM etc. fetched and executed by the CPU, as appropriate.

In operation, as voltage is supplied to the motor primaries 16 via the flexible cables 64, total current generates flux and thrust. As is well known in the art, using algorithms developed for controlling conventional rotating induction motors, the portion of the total current that generates flux is magnetizing current ($I_d$) and the portion of the total current that generates thrust is thrust current ($I_q$). The total current is a vector sum of the thrust current and the magnetizing current. A range of magnetizing current levels can produce a given thrust. A lower thrust level can be produced by a low, medium or high setting of the magnetizing current. However, if a high magnetizing current setting produces a low level of thrust, more heat than is necessary is generated in the motor primary and can result in overheating. Also for high thrust, a high level of magnetizing current is necessary.

The elevator car doors typically have four modes. The first two modes, open and closed, signify final events in response to a selected command. The other two modes, opening and closing are transitioning events. Each mode of elevator car doors requires various amounts of thrust. Opening operation is very aggressive and requires the maximum output available from the motor. Normal closing has a force limit not allowed to exceed one hundred thirty-three Newtons (133 N), as set by the elevator code. Both holding open and holding closed operations require significantly less thrust. However, if there is any interference with either one of these two modes, such as doors being pulled closed during hold open mode or doors being pulled open during hold closed mode, the thrust level must be increased to a value capable of resisting such adverse reactions.

Figure 3:
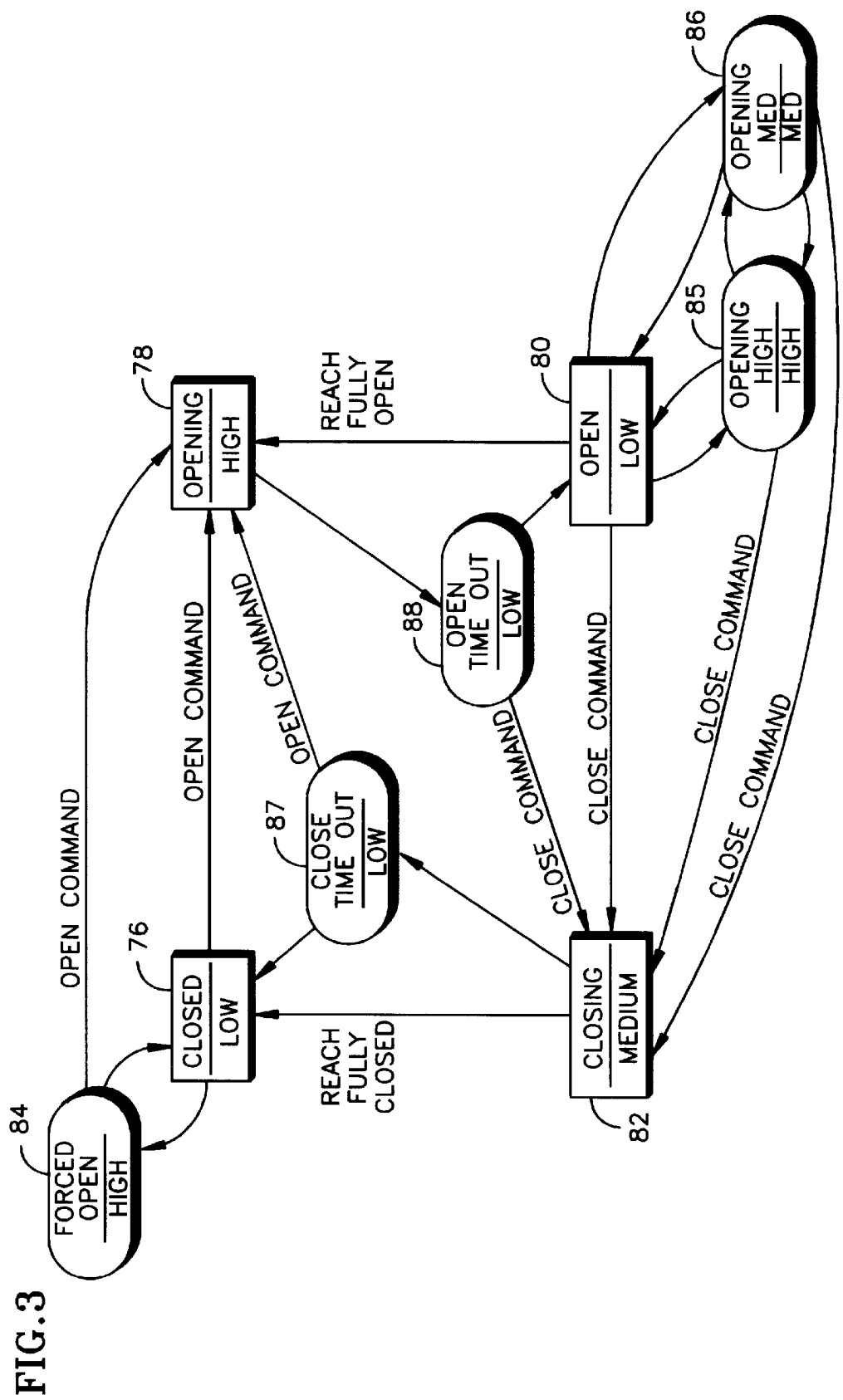
FIG. 3 is a high level, logic flow diagram showing optimization of magnetizing current used in the elevator car door system of FIG. 1, according to the present invention.

Referring to FIG. 3, a flowchart governs the logic of the controller according to the preferred embodiment of the present invention. Four modes of operation, closed 76, opening 78, open 80, and closing 82, are shown enclosed in square boxes with a magnetizing current setting described below. Thus, for the hold closed 76 and hold open 80 modes, the setting for the magnetizing current is low. For the opening operation 78, the level of the magnetizing current is set for high. For the closing operation 82, the level of the magnetizing current is set for medium. Unexpected events 84–88 are shown enclosed in ovals.

Once the doors are in the fully closed position 76, as ascertained by the software through the feedback system supplied with the signal from the first positioning system, the level of the magnetizing current is set to low. In the event that the elevator car doors are being forced opened 84, as the first positioning system detects such an event and the information is fed to the controller 60 via the first cable 68, the level of magnetizing current is then increased to high. The high level of magnetizing current is maintained until one of two events occurs. The first event that would trigger change in the level of magnetizing current is a lapse of time, set herein for five seconds (5 sec). After five seconds (5 sec), the system reverts to the low magnetizing current setting 76.

If the system detects that doors are being forced opened 84 again, the magnetizing current setting becomes high again. Another event that changes the status of the magnetizing current is an open command. Once the controller receives a signal from the operation controller 74 that an open command has been received, regardless of whether the system is in a forced open mode 84 or in closed mode 76, the magnetizing current level is set to high for the doors to be opening 78. The high level of magnetizing current corresponds to the highest level of thrust required for this operation.

As the door controller 60 receives a signal from the first positioning system 42 that the elevator car doors have reached a fully opened position 80, the magnetizing current is reduced to the low setting. If the door controller 60 detects through the first positioning system that the doors are being pulled closed 85, 86, the magnetizing current is increased to a value capable of resisting the pull. Depending on the amount of force applied to pull the doors closed, the magnetizing current is increased either to a high 85 or medium 86 setting.

The level of the magnetizing current changes to medium upon the door controller 60 receiving a command to close the elevator car doors. As the doors are closing 82, a medium level of thrust is required and a medium setting of magnetizing current is set.

Two other unplanned events may occur. First, during closing operation the doors are prevented from closing. If the doors are prevented for more than a pre-set amount of time, in the best mode embodiment set for fifteen seconds (15 seconds), the magnetizing current is reduced to low setting 87. The magnetizing current will remain at this low setting 87 either until the doors reach a fully closed position 76 and the controller is notified by the first positioning system or until the controller receives an open command and the doors enter the opening mode 78.

A second unplanned event would be if during opening 78, the doors are prevented from fully opening. Such an event may occur if the path of the doors in the hoistway is blocked. If the doors do not reach a fully opened position within fifteen seconds (15 sec.), the magnetizing current is set for a low setting 88. The low setting 88 of the magnetizing current will remain either until the doors reach a fully opened position 80, as detected by the first positioning system, or until the controller receives a closing command and doors begin closing 82.

In the best mode embodiment, the magnetizing current setting for high is within the range of six to eight amperes (6 to 8 amps); for medium is within the range of three and a half to five amperes (3.5 to 5 amps); and for low is within the range of two to two and a half amperes (2 to 2.5 amps).

Optimization of magnetizing current for each mode of elevator car door operation significantly reduces prohibitive temperature rise in the motor primaries. For operations such as holding open 80 and holding closed 76, that require less thrust a low setting of magnetizing current is sufficient to generate the necessary thrust. If the magnetizing current setting was high for such operations, the motor primary would overheat. The extra heat cannot dissipate easily because the motor primary is situated in a limited space environment. Overheating would result not only in a short circuit, but also is a limiting factor in the thrust output and door speed. Therefore, by tailoring the necessary amount of magnetizing current to a particular door load, the present inventions minimizes overheating in the motor primary and thereby improves not only the reliability of the door system, but also its efficiency.

One advantage of the present invention is that it reduces power consumption.

Another advantage of the present invention is that the present invention results in increased life of transistors used in the system. As the magnetizing current is reduced, frequency increases for a given thrust. Increased frequency results in reduced fluctuation in the transistors' temperature, therefore increasing the life of the transistors used.

While the present invention has been illustrated and described with respect to a particular embodiment thereof, it should be appreciated by those of ordinary skill in the art, that various modifications to this invention may be made without departing from the spirit and scope of the present invention.

We claim:

1. A system for controlling an elevator car door, comprising:

a door having an opened position and a closed position, an opening mode and a closing mode;

a linear motor coupled to said door for moving said door into said opened position and said closed position; and a controller connected to said linear motor for controlling a magnetizing current to said motor, said controller including software for varying the magnetizing current to a low value when said door is in said opened or said closed position and said controller includes software for varying the magnetizing current to a high value when said door is in said opening mode and to a medium value when said door is in said closing mode.

2. The system for controlling an elevator car door according to claim 1 wherein said high value of said magnetizing current is within the range of six to eight amperes (6–8 amps), said medium value of said magnetizing current is within the range of three and a half to five amperes (3.5 to 5 amps), and said low value of said magnetizing current is within the range of two to two and a half amperes (2 to 2.5 amps).

3. A system for controlling an elevator car door, comprising:

a door having an opened position, a closed position, an opening operation mode, and a closed operation mode;

a linear motor coupled to said door for moving said door in said operation modes between said opened position and said closed position; and a controller connected to said linear motor for providing current to said motor which is the vector sum of a magnetizing current component that generates flux and a thrust current component that generates thrust, said controller including software for varying said magnetizing current component to be of a magnitude when said door is in said opened position or said closed position which is lower than the value of said magnetizing current component provided by said controller when in either of said operation modes.

4. A system according to claim 3 wherein said controller includes software for varying the magnetizing current to a high value when said door is in said opening mode and to a medium value when said door is in said closing mode.

* * * * *